United States Patent
Shima et al.

[11] Patent Number: 6,055,094
[45] Date of Patent: Apr. 25, 2000

[54] OPTICAL AMPLIFYING APPARATUS

[75] Inventors: Michikazu Shima; Hiroshi Nishimoto, both of Kawasaki, Japan

[73] Assignee: Fujitsu Limited, Kawasaki, Japan

[21] Appl. No.: 09/143,404

[22] Filed: Aug. 28, 1998

[30] Foreign Application Priority Data

Mar. 20, 1998 [JP] Japan .................................. 10-072434

[51] Int. Cl.[7] .................................................. H01S 3/00
[52] U.S. Cl. .......................................... 359/341; 359/124
[58] Field of Search ..................................... 359/341, 124

[56] References Cited

U.S. PATENT DOCUMENTS

| | | |
|---|---|---|
| 5,136,420 | 8/1992 | Inagaki et al. . |
| 5,138,483 | 8/1992 | Grasso et al. . |
| 5,430,572 | 7/1995 | DiGiovanni et al. .................... 359/341 |
| 5,664,131 | 9/1997 | Sugiya ..................................... 359/341 |

FOREIGN PATENT DOCUMENTS

| | | |
|---|---|---|
| 2-153327 | 6/1990 | Japan . |
| 3-135081 | 6/1991 | Japan . |
| 4-191826 | 7/1992 | Japan . |
| 8-248455 | 9/1996 | Japan . |
| 9-219696 | 8/1997 | Japan . |

*Primary Examiner*—Mark Hellner
*Attorney, Agent, or Firm*—Staas & Halsey LLP

[57] ABSTRACT

The object of the present invention is to provide an optical amplifying apparatus for collectively amplifying wavelength-division multiplexed signal lights, which can perform amplification in response to input signal light, whose power level is within a wide input dynamic range, without saturating, and which suppresses the influence of the wavelength dependency of gain thereof. Thus, this optical amplifying apparatus is composed of: three optical amplifying portions connected in cascade; an optical attenuating portion for controlling the level of signal light output from the optical amplifying portion provided in the post-stage by regulating the power level of signal light input to the optical amplifying portion provided in the middle stage; and a dispersion compensation fiber provided between the middle stage and post stage optical amplifying. A gain of each of the optical amplifying portions is controlled to be constant by an AGC circuit. As a result of providing the optical amplifying portions in a three-stage constitution, the gain of optical amplifying portion provided in the first stage can be set at a low value. Thus, even when a signal light having a high power level is input, the first stage optical amplifying portion does not saturate. Consequently, the gain is controlled to be constant.

12 Claims, 5 Drawing Sheets

OPTICAL AMPLIFYING APPARATUS

BACKGROUND OF THE INVENTION

1. Field of the Invention

The present invention relates to an optical amplifying apparatus for collectively amplifying wavelength-division multiplexed signal lights, and more particularly, to an optical amplifying apparatus adapted to reduce the influence of the wavelength dependency of gain.

2. Description of the Related Art

There has been a conventional optical amplifying apparatus adapted to perform direct amplification of light by using an optical fiber doped with rare-earth elements, for example, erbium (Er). In the case of this conventional optical amplifying apparatus using a rare-earth-doped optical fiber, the gain thereof has dependence on the wavelength of light. Thus, when wavelength-division multiplexed signal lights obtained by the wavelength-division multiplexing of a plurality of signal lights of plural wavelengths are collectively amplified, there occurs a problem that the gain deviation among gains respectively corresponding to the wavelengths. It is known that the gain tilt among plural wavelengths changes in an optical amplifying apparatus according to the gain of the apparatus. To suppress a change in the gain tilt, there has been proposed, for instance, a conventional system for performing an automatic gain control (AGC) operation so as to control the gain of the optical amplifying apparatus to be constant.

Such a conventional optical amplifying apparatus is, for instance, an optical amplifying apparatus for wavelength-division multiplexing described in Japanese Unexamined Patent Publication No. 8-248455 which is a prior application filed by the present applicant. This conventional optical amplifying apparatus for wavelength-division multiplexing is the one in which two optical amplifiers which have undergone AGC control are connected in cascade, to thereby offset the wavelength-dependency of the gain of the mutual optical amplifiers. Moreover, for example, in Japanese Unexamined Patent Publication No. 9-219696, there has been proposed an optical amplifying apparatus having two-stage constitution by means of two optical amplifiers which have undergone AGC control.

However, in each of the aforementioned conventional optical amplifying apparatuses, when input light power is increased, excitation power supplied to the optical amplifying apparatus reaches a limit, so that the conventional optical amplifying apparatus saturates. Consequently, each of these conventional optical amplifying apparatuses cannot perform a normal AGC operation. In such a case, the gain tilt among the wavelengths of output light is increased owing to the wavelength dependency of the gain of the optical amplifying apparatus. This results in occurrence of a problem that a sufficient input dynamic range for the optical amplifying apparatus cannot be ensured.

For example, a two-stage optical amplifying apparatus that employs optical amplifiers 100 and 200 which are provided with AGC circuits 101 and 201, respectively, as illustrated in FIG. 8. Incidentally, in this case, it is supposed that a variable optical attenuator 300 and a dispersion compensation fiber (DCF) 400 are provided between the optical amplifier 100 provided at a pre-stage and the optical amplifier 200 provided at a post-stage, and that the variable optical attenuator 300 is provided with an automatic level control (ALC) circuit 301 for keeping a level of output signal light OUT at a constant level. FIG. 9 is a diagram showing the level of signal light changing when passing through components of this optical amplifying apparatus.

In FIG. 9, reference characters S1 and S2 designate the saturation level of output light power of the optical amplifier 100 and the saturation level of output light power of the optical amplifier 200, respectively. In this case, an attenuation quantity to be attenuated by the variable optical attenuator 300 is controlled by the ALC circuit 301 in such a manner that the output light power of the optical amplifier 200 becomes constant in the vicinity of the saturation level S2. The gain of the optical amplifier 100 is controlled by the AGC circuit 101 to be constant. As a result, the slope of the signal light level between the input to and the output of the optical amplifier 100 is constant even when the level of the input signal light IN varies in a range of the level from Pi(MIN) to Pi(MAX). Thus, when the maximum level Pi(MAX) of the input signal light IN increases as indicated by a dashed line in FIG. 9, the output light of the optical amplifier 100 saturates. Consequently, to prevent the aforementioned gain tilt between the wavelengths from increasing, only the narrow input dynamic range as indicated by a solid line in FIG. 9 can be ensured.

SUMMARY OF THE INVENTION

The present invention is accomplished in view of the aforementioned problems of the conventional apparatus.

Accordingly, an object of the present invention is to provide an optical amplifying apparatus which can restrain the gain tilt between wavelengths of output signal light from increasing, even when collectively amplifying multiwavelength signal light by employing a wide input dynamic range.

To achieve the foregoing object, in accordance with an aspect of the present invention, there is provided an optical amplifying apparatus which comprises: a first optical amplifying device for collectively amplifying wavelength-division multiplexed signal lights; and a second optical amplifying device, connected in cascade with the first optical amplifying device, for amplifying signal lights output from the first optical amplifying device and for outputting the amplified signal light, wherein the first optical amplifying device includes at least two amplifying portions, connected in cascade, for amplifying signal lights, and one of the optical amplifying portions, which is provided in a first stage, amplifies signal lights at a gain less than a predetermined gain set in the first optical amplifying device.

With such a constitution, a wavelength-division multiplexed signal light is amplified by each of the optical amplifying portions of the first optical amplifying device. Subsequently, the amplified signal light is further amplified by the second optical amplifying device. As a result of establishing an optical amplifying constitution of three or more stages by providing at least two optical amplifying portions in the first optical amplifying device, the gain of the optical amplifying portion provided in the first stage of the first optical amplifying device is set to be less than a predetermined gain set in the first optical amplifying device as the gain of the entire first optical amplifying device. Thus, even when a signal light having a more higher power level is input to the first stage optical amplifying portion, this first stage optical amplifying performs an optical amplifying operation without saturating. Consequently, an optical amplifying apparatus having a wide input dynamic range can be provided.

Further, in the case of the aforementioned amplifying apparatus, each of the optical amplifying portions of the aforesaid first optical amplifying device and the second optical amplifying device may be provided with a gain control portion for controlling the gain thereof to be nearly constant. Thus, the gain of each of the amplifying portions and the second optical amplifying device is controlled by the gain control portion to be nearly constant. Consequently, the wavelength dependency of the gain is restrained. Therefore, an output signal light having a small gain deviation between wavelengths can be obtained.

Moreover, the optical amplifying apparatus of the present invention may further comprise: an optical attenuating device for attenuating at least one of a signal light input to the optical amplifying portions respectively provided in a second and higher-order stages of the first optical amplifying device and a signal light input to the second optical amplifying device; and a level control device for regulating an attenuation quantity attenuated by the optical attenuating device and for controlling the power level of signal light output from the aforesaid second optical amplifying device to be nearly constant. With such a constitution, the power level of signal light output from this optical amplifying apparatus is controlled to be approximately constant. Therefore, the optical amplifying apparatus, in which the amplifying operation is more stable, can be provided.

Furthermore, in accordance with another aspect of the present invention, there is provided an optical amplifying apparatus which comprises: a first optical amplifying device for collectively amplifying wavelength-division multiplexed signal lights; and a second optical amplifying device, connected in cascade with the aforesaid first optical amplifying device, for amplifying signal lights output from the first optical amplifying device, wherein the optical amplifying apparatus further comprises: an optical attenuating device for attenuating signal lights input to the first optical amplifying device; and a level control device for regulating an attenuation quantity attenuated by the optical attenuating device based on a power level of signal light output from the second optical amplifying device and for controlling a power level of signal light input to the first optical amplifying device to be lower than a level at which the first optical amplifying device is put into a saturation state.

With such a constitution, a wavelength-division multiplexed signal light is amplified by the first optical amplifying device after passing through the optical attenuating device. Subsequently, the amplified signal light is further amplified by the second optical amplifying device. The attenuation quantity attenuated by the optical attenuating device is regulated by the level control device on the basis of the power level of signal light output from the second amplifying device so that the power level of signal light input to the first optical amplifying device is lower than the level at which the first optical amplifying device is brought into the saturation state. Thus, a signal light having high power level, at which the first optical amplifying device saturates, is input to the first optical amplifying device after attenuated by the optical attenuating device. Consequently, the first optical amplifying device performs an amplification operation without saturating. Therefore, an optical amplifying apparatus having a wide input dynamic range can be provided.

Further, the level control device may control the power level of signal light output from the second optical amplifying device to be nearly constant. Furthermore, the optical attenuating device may attenuate signal lights input to each of the first and second optical amplifying devices. Consequently, the power level of signal light output from this optical amplifying apparatus is controlled to be nearly constant.

Besides, in accordance with still another aspect of the present invention, there is provided an optical amplifying apparatus which comprises: a first optical amplifying device for collectively amplifying wavelength-division multiplexed signal lights; and a second optical amplifying device, connected in cascade with the first optical amplifying device, for amplifying signal lights output from the first optical amplifying device, wherein the optical amplifying apparatus further comprises: a first optical attenuating device for attenuating signal lights input to the first optical amplifying device; an optical power detecting device for detecting a power level of signal light output from the first optical attenuating device; and a first level control device for regulating an attenuation quantity attenuated by the first optical attenuating device based on a result of detection of the optical power detecting device and for controlling a power level of signal light input to the first optical amplifying device to be lower than a level at which the first optical amplifying device is put into a saturation state.

With such a constitution, the power level of signal light input to the first optical amplifying device is detected by the optical power detecting device. Based on a result of detection, the attenuation quantity by the first optical attenuating device is regulated by the first level control device so that the power level of signal light input to the first optical amplifying device is lower than the level at which the first optical amplifying device is brought into the saturation state. Thus, a signal light having high power level, at which the first optical amplifying device saturates, is input to the first optical amplifying device after attenuated by the first optical attenuating device. Consequently, the first optical amplifying device performs an amplification operation without saturating.

Additionally, the optical amplifying apparatus may further comprises: a second optical attenuating device for attenuating signal lights input to the second optical amplifying device; and a second level control device for regulating an attenuation quantity attenuated by the second optical attenuating device and for controlling a power level of signal light output from the second optical amplifying device to be nearly constant. Thereby, the power level of signal light output from the optical amplifying apparatus is controlled to be almost constant.

Further, in each of another aspects of the optical amplifying apparatus, the first and second optical amplifying devices may be provided with a gain control portion for controlling a gain thereof to be nearly constant. Thus, the gain of each of the optical amplifying devices is controlled to be nearly constant. Consequently, the wavelength dependency of the gain is suppressed. Furthermore, an output signal light having a small gain deviation between wavelengths, can be obtained.

In addition, each of another aspects of the optical amplifying apparatus may be provided with at least on intermediate optical amplifying device connected in cascade between the first and second optical amplifying devices. Even in a three or more stage constitution having the first and second optical amplifying devices and the intermediate optical amplifying device, the first optical amplifying device performs amplification operations without saturating. Thus, a wavelength-division multiplexed signal light is amplified by each of the optical amplifying devices.

Other features, objects and advantages of the present invention will become apparent from the following description of preferred embodiments with reference to the drawings.

DETAILED DESCRIPTION OF THE PREFERRED EMBODIMENTS

Hereinafter, preferred embodiments of the present invention will be described in detail by referring to the accompanying drawings.

Figure 1:
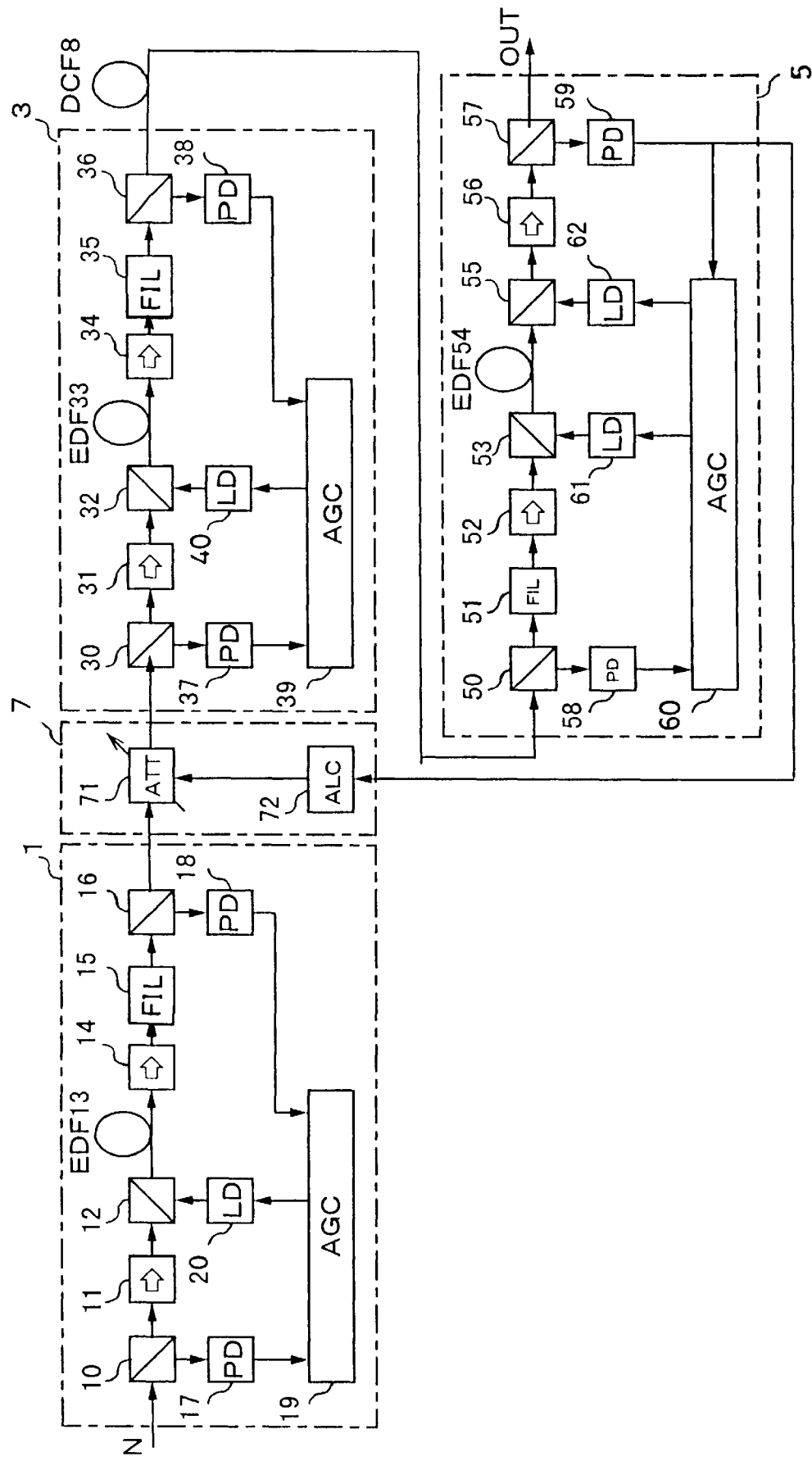
FIG. 1 is a block diagram showing a constitution or configuration of a first embodiment of the present invention.

FIG. 1 is a block diagram showing a constitution of an optical amplifying apparatus according to a first embodiment of the present invention.

As shown in FIG. 1, this optical amplifying apparatus has a three-stage constitution comprising: an optical amplifying portion 1 for amplifying, for instance, wavelength-division multiplexed input signal light IN at a constant gain and for outputting the amplified signal light; an optical amplifying portion 3 for receiving a signal light output from the optical amplifying portion 1 through an optical attenuating portion 7, for amplifying the received signal light at a constant gain and for outputting the amplified signal light; and an optical amplifying portion 5 serving as a second optical amplifying device, for receiving the signal light output from the optical amplifying portion 3, through a dispersion compensation fiber (DCF) 8, for amplifying the received signal light at a constant gain and for outputting the amplified signal light. Incidentally, in this apparatus, the optical amplifying portions 1 and 3 act as a first optical amplifying device.

In the optical amplifying portion 1, for example, the input signal light IN is sent to an Er-doped fiber (EDF) 13 through an optical coupler 10, an optical isolator 11 and an optical coupler 12. The optical coupler 10 divides a part of the input signal light IN into two light beams and sends one of the light beams to the optical isolator 11 and also sends the other light beam to a light receiver (PD) 17 to be described later. The optical isolator 11 transmits a signal light traveling from the optical coupler 10 to the optical coupler 12, and blocks a signal light traveling in the opposite direction. The optical coupler 12 combines the signal light from the optical isolator 11, and an excitation light, which is output from an excitation light source (LD) 20 (to be described later) to send the combined light to the EDF 13. Further, the EDF 13 is an optical fiber to which Er and aluminum (Al) are doped, and is put into by the excitation light from the optical coupler 12, into an inverted population state and amplifies the signal input due to induced emission function.

A signal light output from the EDF 13 is output to the optical attenuating portion 7 through an optical isolator 14, an optical filter 15 and an optical coupler 16. The optical isolator 14 transmits only signal light travelling from the EDF 13 to the optical coupler 16, similarly as the optical isolator 11 does. The optical filter 15 is a filter for correcting the wavelength-dependency of the EDF 13. The optical coupler 16 divides the signal light output from the optical filter 15 into two light beams and sends one of the light beams to the optical attenuating portion 7 and also sends the other light beam to a light receiver (PD) 18. The light receiver 17 and 18 convert the signal light divided by each of the optical coupler 10 and 16 into an electric signal, to output the electric signal to the automatic gain control (AGC) circuit 19 serving as a gain control portion. Further, the AGC circuit 19 monitors the input and output light levels of the optical amplifying portion 1 on the basis of electric signals sent from each of the light receivers 17 and 18, to control an excitation light source 20 so that the gain of the optical amplifying portion 1 is constant. It is desirable that a light source having a wavelength of 980 nm is used as the excitation light source 20 to realize a low-noise optical amplifying portion 1.

The optical amplifying portion 3 has a constitution similar to that of the optical amplifying portion 1. Incidentally, a constant power signal light is input to the optical amplifying portion 3 by the optical attenuating portion 7 to be described later.

Further, the DCF 8 is suitably provided for compensating the dispersion characteristics of a transmission path connected to this optical amplifying apparatus. If there is no need for compensating the dispersion characteristics, a fixed optical attenuator may be provided in the apparatus, alternatively, the output signal light of the optical amplifying portion 3 may be directly input to the optical amplifying portion 5.

In the optical amplifying portion 5, the signal light output from the DCF 8 is sent to an EDF 54 through an optical coupler 50, an optical filter 51, an optical isolator 52 and an optical coupler 53. The optical coupler 50 is provided in the apparatus so as to send a part of signal light to be input to the optical amplifying portion 5, to an AGC circuit 60 through a light receiver 58, similarly as the optical coupler 10 does. The optical filter 51 is a filter to correct the wavelength dependency of the EDF 54 and in this embodiment, is provided at a pre-stage side of the EDF 54. The optical isolator 52 transmits only signal light traveling from the optical filter 51 to the optical coupler 53, similarly as in the case of the optical isolator 14. The optical coupler 53 combines a forward excitation light from an excitation light source 61, with the signal light from the optical isolator 52, to output a resultant light to the EDF 54. The EDF 54 has the same constitution as that of the EDF 13, however, here, the forward excitation light combined by the optical coupler 53, and a backward excitation light from an excitation light source 62 which is to be combined by an optical coupler 55, are input to the EDF 54 so as to obtain a high output signal light. It is desirable that each of the wavelengths of the forward and backward excitation lights is, for instance, 1480 nm, to realize a high output optical amplifying portion 5.

The signal light output from the EDF 54 is output, as an output signal light OUT, to the exterior through the optical coupler 55, an optical isolator 56 and an optical coupler 57.

The optical isolator 56 transmits only a signal light traveling from the optical coupler 55 to the optical coupler 57, similarly as the optical isolator 52 does. The optical coupler 57 divides the signal light from the optical isolator 56 into two light beams and sends one of the light beams to the exterior and also sends the other light beam to a light receiver 59. The light receiver 59 converts one of the divided signal light from the optical coupler 57 into an electric signal, to output the electric signal to both of an AGC circuit 60 and the optical attenuating portion 7. Further, the AGC circuit 60 serving as a gain control portion monitors the input and output light levels of the optical amplifying portion 5 on the basis of electric signals from each of the light receivers 58 and 59 to control the power of each of the excitation lights output from each of excitation light sources 61 and 62 so that the gain of the optical amplifying portion 5 is constant.

The optical attenuating portion 7 consists of: a variable optical attenuator 71 acting as an optical attenuating device; and an automatic level control (ALC) circuit 72 serving as a level control device. The signal light output from the optical amplifying portion 1 is input to the variable optical attenuator 71 which then attenuates the input signal light according to a level control signal sent from the ALC circuit 72, and sends the attenuated signal light to the optical amplifying portion 3. The ALC circuit 72 monitors the power of the output signal light OUT based on an electric signal from the light receiver 59 of the optical amplifying portion 5 and generates a level control signal for regulating the attenuation quantity attenuated by the variable optical attenuator 71 so that the power level of the output signal light OUT is constant. This control operation by the ALC circuit is similar to an ALC operation performed by the conventional amplifying apparatus of the two-stage constitution.

Next, an operation of this embodiment will be described hereinbelow.

Figure 2:
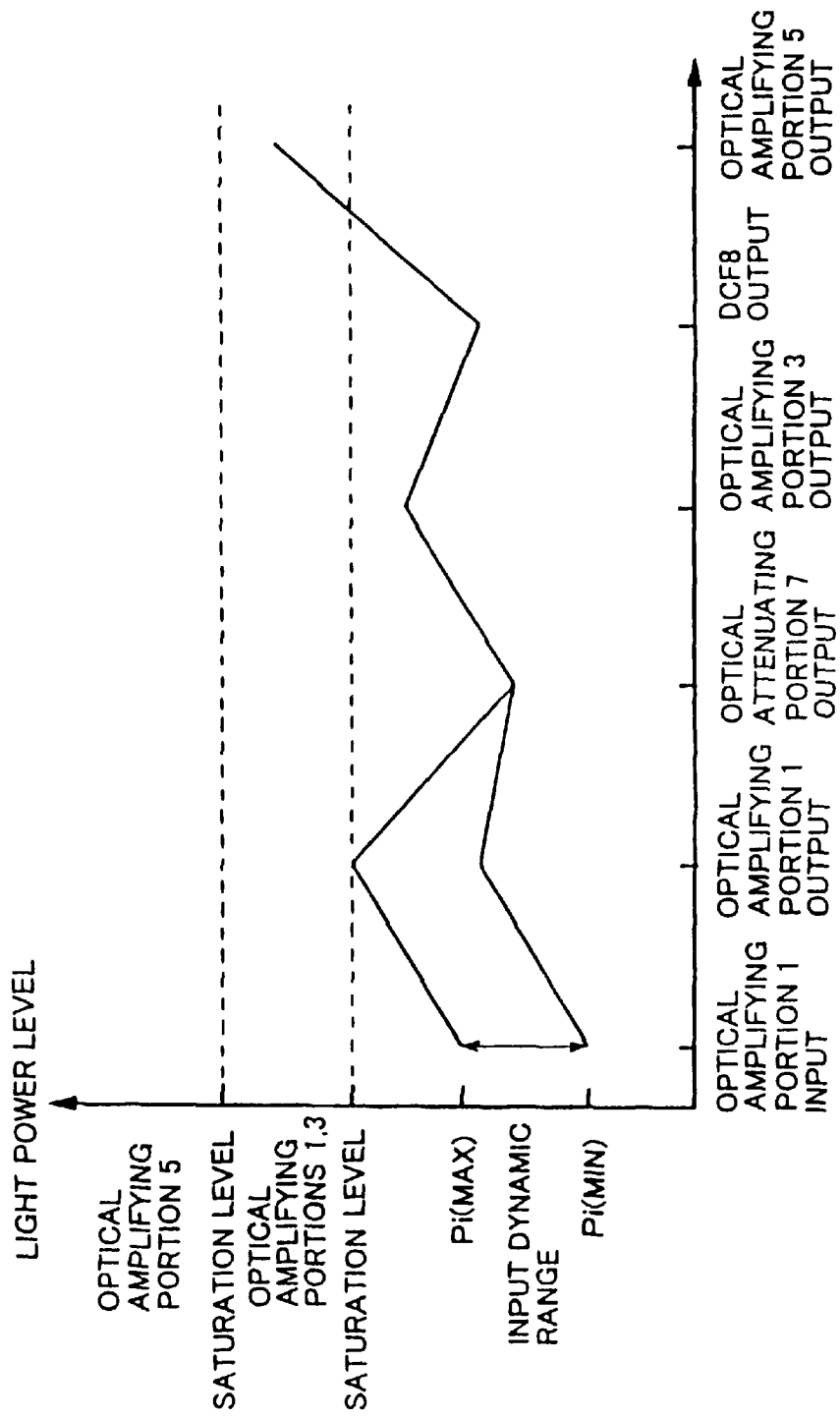
FIG. 2 is a diagram showing the level of signal light changing when passing through components of an optical amplifying apparatus according to the first embodiment of the present invention.

FIG. 2 is a diagram showing the level of signal light changing when passing through components of this optical amplifying apparatus.

As shown in FIG. 2, it is supposed that a power level Pi of the input signal light IN is within a predetermined range (between Pi(MIN) and Pi(MAX)) which is assumed in a system design stage. When such an input signal light IN is sent to this apparatus, the input signal light IN is first amplified by the optical amplifying portion 1. In this optical amplifying portion 1, an operation of the excitation light source 20 is controlled by the AGC circuit 19 so that the gain is constant even when the power level Pi of the input signal light IN changes. Consequently, the slope of the signal light level between the input to and the output of the optical amplifying portion 1 is constant regardless of the power level Pi of the input signal light IN. Further, as a result of constituting the optical amplifying portion to consist of three stages, the gain of the optical amplifying portion 1 can be set to be small in comparison with the gain of the pre-stage optical amplifying portion of the conventional two-stage optical amplifying apparatus. Namely, the gain of the conventional apparatus, which has been obtained by the pre-stage optical amplifying portion, may be obtained by the two amplifying portions 1 and 3 of the present apparatus. Thus, the gain to be obtained by the first stage of the optical amplifying portion 1 can be reduced. Consequently, the slope of the signal light level in the optical amplifying portion 1 becomes small. Thus the tolerance of the maximum input signal light power Pi(MAX) until the level of the output signal light of the optical amplifying portion 1 reaches the saturation level increases.

The signal light amplified in the optical amplifying portion 1 at a constant gain without saturating is sent to the optical amplifying portion 3 after attenuated by the variable optical attenuator 71 of the optical attenuating portion 7. In the optical attenuating portion 7, the attenuation quantity attenuated by the variable optical attenuator 71, is controlled so that the power level Po of output signal light OUT from the final stage optical amplifying portion 5 is constant. Thus, the power level of the input signal light to the optical amplifying portion 3 is controlled to be constant. The power level of signal light input to the optical amplifying portion 3 is set so as to prevent output light of the optical amplifying portion 3 from reaching a saturation level and as not to be too low in view of a noise factor.

Similarly as in the case of the operation of the optical amplifying portion 1, the input signal light is amplified at a constant gain without saturating in the optical amplifying portion 3, and this amplified signal light is then sent to the DCF 8. Incidentally, the gain of the optical amplifying portion 3 is set so as to obtain an output light level at which no influence of non-linear effects occurs in the DCF 8. The signal light output from the optical amplifying portion 3 undergoes the dispersion compensation by passing through the DCF 8, and is then sent to the optical amplifying portion 5. Additionally, the DCF 8 has a constant insertion loss, so that the power level of the signal light after passing through the DCF 8 lowers by a certain quantity.

Similarly as in the case of the operation of the post-stage optical amplifying portion of the conventional optical amplifying apparatus of the two-stage constitution, the signal light sent to the optical amplifying portion 5 is amplified at a constant gain immediately before the level thereof reaches the saturation level of the optical amplifying portion 5. Then, the amplified signal is output therefrom as an output signal light OUT. A part of this output signal light OUT is divided by the optical amplifying portion 5 and is then converted by the light receiver 59 into an electric signal. This electric signal is then sent to both of the AGC circuit 60 and the ALC circuit 72.

Incidentally, an ALC operation of this optical amplifying apparatus will be practically described hereinbelow.

Input signal light IN having a power level Pi (Pi(MIN) $\leq$ Pi $\leq$ Pi(MAX)) [dBm] is first input to the present apparatus, then, amplified by passing through each component. When an amplified output signal OUT is output, a part of the output signal light OUT is sent to the ALC circuit 71 through the optical coupler 57 and the light receiver 59. In the ALC circuit 71, the power level Po [dBm] of the output signal light OUT is detected based on an electric signal sent from the light receiver 59. Incidentally, if G1, G3 and G5 designate the gains [dB] of the optical amplifying portions 1, 3 and 5, which are controlled to be constant, respectively, further, Lc [dB] designates the insertion loss of the DCF 8, the attenuation quantity La [dB] by the variable optical attenuator 71 and the power level Po of the output signal light has the following relation:

$$La = Po - (Pi + G1 + G3 + G5 - Lc) \tag{1}$$

Moreover, in the case that the level of the input signal IN changes and thus the level of the output signal light OUT becomes Po', the attenuation quantity La the variable optical attenuator 71 is controlled to be the following attenuation quantity La':

$$La' = Po' - (Pi + G1 + G3 + G5 - Lc) \tag{2}$$

Namely, a change ΔLa in the attenuation quantity by the variable attenuator 71 is obtained from the aforementioned equations (1) and (2) as follows:

$$La = La' - La = Po' - Po \quad (3)$$

Thus, the ALC operation, for keeping the output signal light level to be constant, is performed by changing the attenuation quantity by the variable optical attenuator 71 by a quantity equal to an amount of a change in (power) level of the output signal light OUT.

In this manner, in accordance with the first embodiment, the optical amplifying portion is constituted by three stages, in which the gain of the optical amplifying portion 1 is set at a low value, the gain, which has been obtained by the pre-stage optical amplifying portion of the conventional optical amplifying apparatus of the two-stage constitution, is obtained by both of the optical amplifying portions 1 and 3 of the present embodiment. This enables the optical amplifying portion 1 to perform AGC operation without saturating, even when the input signal light IN has a power level higher than the power levels treated by the conventional optical amplifying apparatus. Consequently, the input dynamic range of the optical amplifying apparatus of the present invention can be extended.

Figure 3:
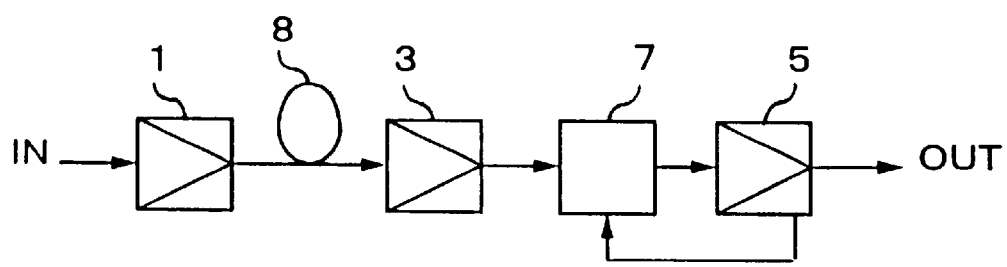
FIG. 3 is a block diagram showing another constitution obtained by changing the placement of an optical attenuating portion in the first embodiment of the present invention.

Incidentally, in the first embodiment of the present invention, the optical attenuating portion 7 is provided between the optical amplifying portions 1 and 3. Further, the DCF 8 is provided between the optical amplifying portions 3 and 5. The present invention is not limited thereto. For instance, the DCF 8 may be provided between the optical amplifying portions 1 and 3, and the optical attenuating portion 7 may provided between the optical amplifying portions 3 and 5, as shown in FIG. 3. Additionally, in this case, there is necessity for setting the gain of each of the optical amplifying portions 1 and 3 so that the optical amplifying portion 3 does not saturate in the range of the power level of the input signal light IN. With such a constitution, although the noise factor of the entire optical amplifying apparatus increases, the level of the output signal light output therefrom can be set at a higher level.

Figure 4:
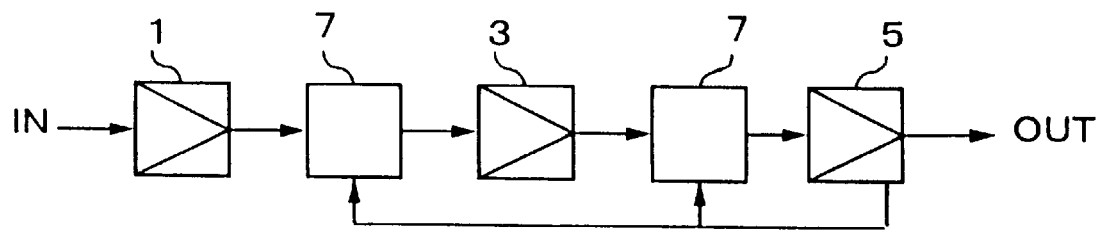
FIG. 4 is a block diagram showing still another constitution obtained by placing optical attenuating portions between respective optical amplifying portions in the first embodiment of the present invention.

Moreover, for example, as illustrated in FIG. 4, the constitution may be such that two optical attenuating portion 7 are provided between each optical amplifying portion and the two optical attenuating portions 7 perform an operation of controlling the power level of the output signal light to be constant. Basically, the ALC operation in this case is similar to the aforementioned ALC operation, however, it should be considered that, when the distribution of the attenuation quantity in the optical attenuating portions 7 is set, each of the optical amplifying portions 3 and 5 does not saturate, and the attenuation quantity in the post-stage optical attenuating portion 7 is preferentially increased and the other optical attenuating portion 7 provided in the pre-stage makes up for a deficiency of the attenuation quantity, which is caused in the post-stage optical attenuating portion 7. Thus, by preferentially increasing the attenuation quantity in the post-stage optical attenuating portion 7, this constitution has an advantageous effect in that the noise factor is reduced to a further smaller value.

Furthermore, in the foregoing description of the first embodiment of the present invention, there has been described the optical amplifying apparatus that employs the three-stage constitution instead of the conventional two-stage constitution. However, the present invention is not limited to the apparatus of the three-stage constitution. The apparatus of the present invention may employ four or more stages (namely, four or more optical amplifying portions), so long as the apparatus expands the input dynamic range by dividing an optical amplifying portion of the conventional apparatus, in which the input dynamic range should be narrow so as to prevent the saturation thereof, into a plurality of optical amplifying portions, to set the gain of the first stage optical amplifying portion at a low value.

Next, a second embodiment of the present invention will be described hereinbelow.

Figure 5:
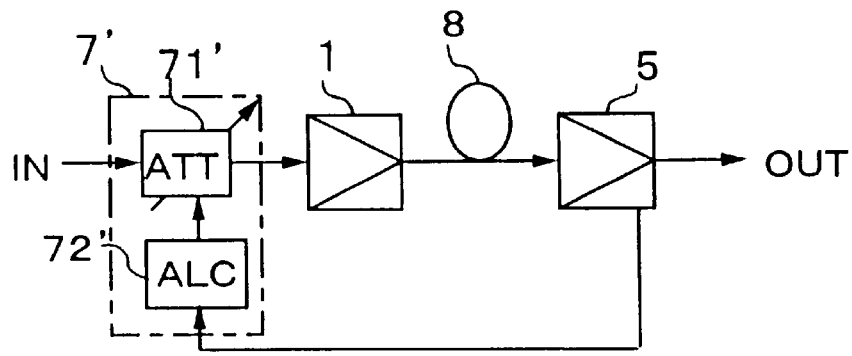
FIG. 5 is a block diagram showing a constitution of a second embodiment of the present invention.

FIG. 5 is a block diagram showing the constitution of another optical amplifying apparatus according to the second embodiment of the present invention. Incidentally, in this figure, same reference characters designate same components of the first embodiment of the present invention.

As shown in FIG. 5, this optical amplifying apparatus is constituted by providing an optical attenuating portion 7' in the front stage of the optical amplifying portion 1 of a two-stage structure in which the optical amplifying portions 1 and 5 are connected to each other through the DCF 8. The optical attenuating portion 7' consists of: a variable optical attenuator (ATT) 71' serving as the optical attenuating device; and an ALC control circuit 72' acting as the level control device, similarly as the optical attenuating portion 7 of the first embodiment of the present invention. Basically, an ALC operation to be performed in this optical attenuating portion 7' is similar to the ALC operation performed in the optical attenuating portion 7. Characteristic aspect of this embodiment resides in that the optical attenuating portion 7' is placed in the front stage of the optical amplifying portion 1 so as to prevent the optical amplifying portion 1 from saturating even when a signal light having large power is input to the apparatus.

As above described, when the power level of the signal light input to the optical amplifying portion I is increased and exceeds a certain level, the level of the signal light output from the optical amplifying portion 1 saturates. When the level of the output light of the optical amplifying portion 1 reaches the saturation level, the output light is output through the DCF 8 and the optical amplifying portion 5 as the output signal light OUT of this apparatus. The power level Po of this output signal light is a specified level because of the facts that the insertion loss of the DCF 8 is constant and that the gain of the optical amplifying portion 5 is constant. In this embodiment, such a power level of the output signal light OUT is assumed to be the saturation output light level thereof.

When the ALC operation is performed in the optical attenuating portion 7', similarly as in the case of the first embodiment, by placing the optical attenuating portion 7' in the front stage of the optical amplifying portion 1 as above described, the saturation of the optical amplifying portion 1 can be prevented by setting the power level Po of the output signal light OUT, which is controlled by the ALC control circuit 72', to be less than the aforementioned saturation level. Namely, even when the power level of the input signal light IN increases, the attenuation quantity by the optical attenuator 71' is increased so that the power level Po of the output signal light OUT is less than the saturation output light level. Thus, such a signal light, which would cause the level of the output light of the optical amplifying portion 1 to reach the saturation level, is not input to the optical amplifying portion 1 at all.

In this manner, in accordance with the second embodiment of the present invention, in the optical amplifying apparatus using the optical amplifying portions provided in the two-stage structure, the input dynamic range can be further expanded, as a result of placing the optical attenuating portion 7' in the front stage of the optical amplifying portion 1. Incidentally, in such a constitution, the level of the signal light input to the post stage optical amplifying portion 5 becomes low, in comparison with the case of the first embodiment of the present invention. This results in deteriorated noise factor of the entire optical amplifying apparatus. Therefore, the application of the constitution of the second embodiment to an optical amplifying apparatus used in a system having relatively ample room for regulating the noise characteristics is advantageous to the cost thereof, because the input dynamic range is expanded without increasing the number of stages of optical amplifying portions.

Figure 6:
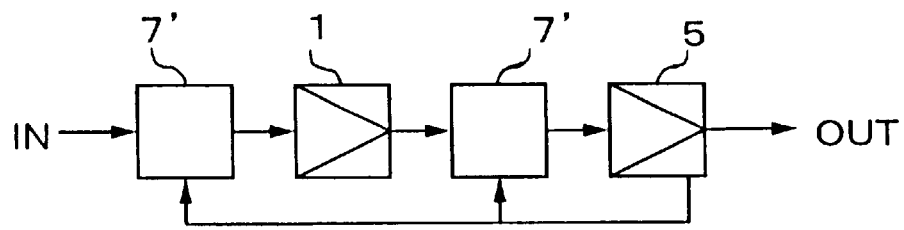
FIG. 6 is a block diagram showing another constitution obtained by placing optical attenuating portions between the respective optical amplifying portions in the second embodiment of the present invention.

Additionally, although the DCF 8 is provided between the optical amplifying portions 1 and 5 in the second embodiment of the present invention, this DCF 8 may be provided only in the case that there is a need for performing the dispersion compensation. In the case where the dispersion compensation is not necessarily needed, a fixed optical attenuator may be provided in the apparatus instead of the DCF 8, alternatively, the output signal light of the optical amplifying portion 1 may be directly input to the optical amplifying portion 5. Furthermore, as illustrated in FIG. 6, the optical attenuating portion 7' may be further provided between the optical amplifying portions 1 and 5, so that two optical attenuating portions 7' perform an operation of controlling the level of the output signal light to be constant. ALC operation in this case is similar to the ALC operation in the case which has been above described with reference to FIG. 4.

Next, a third embodiment of the present invention will be described hereinbelow.

Figure 7:
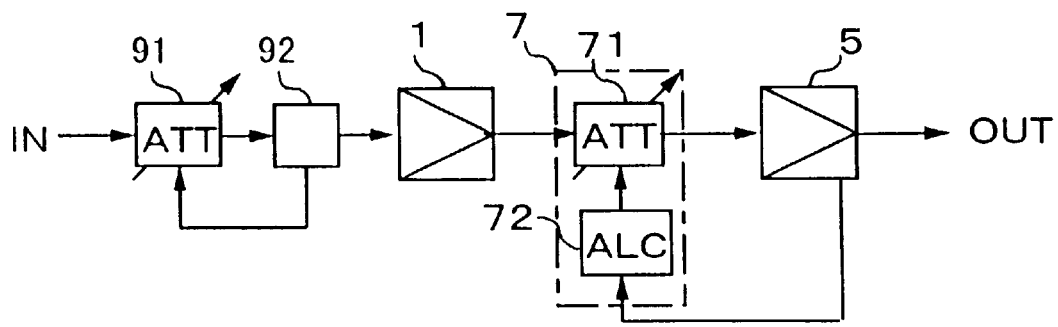
FIG. 7 is a block diagram showing a constitution of a third embodiment of the present invention.
Figure 8:
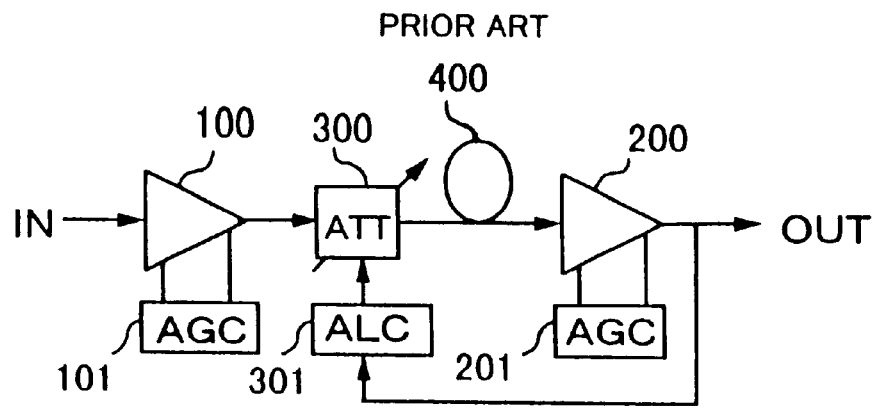
FIG. 8 is a block diagram showing an example of the constitution of a conventional optical amplifying apparatus.
Figure 9:
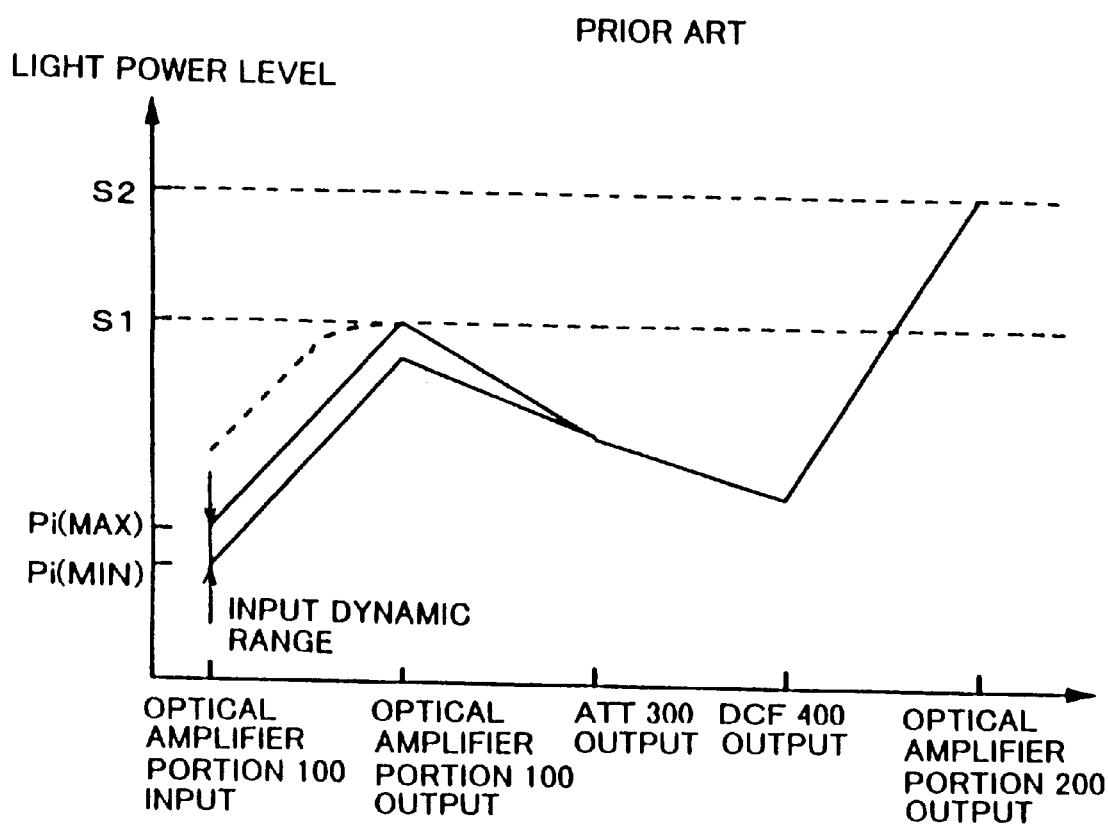
FIG. 9 is a diagram showing the level of signal light changing when passing through components of the conventional optical amplifying apparatus.

FIG. 7 is a block diagram showing the constitution of still another optical amplifying apparatus according to the third embodiment of the present invention. Incidentally, in this figure, same reference characters designate same components of the first embodiment of the present invention.

As shown in FIG. 7, with the present apparatus, a variable optical attenuator (ATT) 91 and an optical power monitor 92, serving as an optical power detecting device, are provided in the front stage of the optical amplifying portion 1 of the two-stage structure which has the two optical amplifying portions 1 and 5. Further, an optical attenuating portion 7, which is similar to the optical attenuating portion 7 of the first embodiment, is provided between the optical amplifying portions 1 and 5. The variable optical attenuator 91 attenuates the input signal light IN according to the optical power level detected by the optical power monitor 92 so that the signal light power to be input to the optical amplifying portion 1 does not reach the saturation level. In this embodiment, the variable optical attenuator 91 functions as the first optical attenuating device and the first level control device. Moreover, the variable optical attenuator 71 and the ALC circuit 72 of the optical attenuating portion 7 act as the second optical attenuating device and the second level control device, respectively.

In the optical amplifying apparatus with such a constitution, the power level of signal light input to the optical amplifying portion 1 through the variable optical attenuator 91 is monitored by the optical power monitor 92. In the case that signal light having high power level, by which the optical amplifying portion 1 saturates, is input, the attenuation quantity by the variable optical attenuator 91 is controlled so that a signal light having power level less than the saturation level, is input to the optical amplifying portion 1. Further, the optical attenuating portion 7 operates based on the level of the output light of the optical amplifying portion 2. Consequently, the level of the output light of this optical amplifying apparatus is maintained at a constant level.

As above stated, according to the third embodiment of the present invention, the noise characteristics are deteriorated in comparison with the first embodiment, however, similarly as in the case of the second embodiment, even in the case that a signal light having power level exceeding the assumed level, is input to this apparatus of the present invention, since the gain tilt can be restrained from occurring, the input dynamic range can be expanded.

Incidentally, although an ALC operation is performed by providing the optical attenuating portion 7 between the optical amplifying portions 1 and 5 in the third embodiment of the present invention, the control operation by the ALC circuit is not necessarily needed. This is because of the facts that the optical amplifying portions 1 and 5 perform at a constant gain and thus, the level of the output light of the optical amplifying portion 5 is nearly constant by performing the level regulation at the input side. Needless to say, accuracy in controlling the level of the output light of the apparatus is enhanced by providing the ALC circuit in the apparatus.

Further, in the foregoing description of the second and third embodiments of the present invention, there have been described the apparatus of the two-stage constitution in which two optical amplifying portions are provided in the two stages, respectively. However, even in the case where the apparatus has a three or more stage constitution in which three or more an optical amplifying portions are provided, the input dynamic range can be expanded, similarly as in the case of the aforementioned embodiments, by placing the optical attenuating portion 7' or a set of the variable optical attenuator 91 and the optical power monitor 92 in the front stage of the optical amplifying portion provided in the first stage.

What is claimed is:

1. An optical amplifying apparatus comprising:

first optical amplifying means for collectively amplifying wavelength-division multiplexed signal light; and second optical amplifying means, connected in cascade with said first optical amplifying means, for amplifying signal light output from said first optical amplifying means and then outputting the amplified signal light, wherein said first optical amplifying means includes at least two amplifying portions, connected in cascade, for amplifying signal light, and one of said optical amplifying portions, which is provided in a first stage, amplifies signal light with a gain less than a predetermined gain so that the amplified light is not saturated.

2. An optical amplifying apparatus according to claim 1, wherein the second optical amplifying means has at least one optical amplifying portion, and each of said optical amplifying portions of said first optical amplifying means and said second optical amplifying means is provided with a gain control portion for controlling a gain thereof to be nearly constant.

3. An optical amplifying apparatus according to claim 1, wherein the first optical amplifying means has second and higher order stages, the apparatus further comprising:

optical attenuating means for attenuating at least one of a signal light input to said optical amplifying portions respectively provided in second and higher-order stages of said first optical amplifying means and a signal light input to said second optical amplifying means; and level control means for regulating an attenuation quantity attenuated by said optical attenuating means and for controlling a power level of signal light output from said second optical amplifying means to be nearly constant.

4. An optical amplifying apparatus comprising:

first optical amplifying means for collectively amplifying wavelength-division multiplexed signal light; and second optical amplifying means, connected in cascade with said first optical amplifying means, for amplifying signal light output from said first optical amplifying means;

optical attenuating means for attenuating signal light input to said first optical amplifying means; and level control means for regulating an attenuation quantity attenuated by said optical attenuating means based on a power level of signal light output from said second optical amplifying means and for controlling a power level of signal light input to said first optical amplifying means to be lower than a level at which said first optical amplifying means is put into a saturation state.

5. An optical amplifying apparatus according to claim 4, wherein said level control means controls a power level of signal light output from said second optical amplifying means to nearly constant.

6. An optical amplifying apparatus according to claim 5, wherein said optical attenuating means attenuates the signal light input to each of said first and second optical amplifying means.

7. An optical amplifying apparatus comprising:

first optical amplifying means for collectively amplifying wavelength-division multiplexed signal light; and second optical amplifying means, connected in cascade with said first optical amplifying means, for amplifying signal light output from said first optical amplifying means;

first optical attenuating means for attenuating signal light input to said first optical amplifying means;

optical power detecting means for detecting a power level of signal light output from said first optical attenuating means; and first level control means for regulating an attenuation quantity attenuated by said first optical attenuating means based the power level detected by said detecting means and for controlling a power level of signal light input to said first optical amplifying means to be lower than a level at which said first optical amplifying means is put into a saturation state.

8. An optical amplifying apparatus according to claim 7, which further comprises:

second optical attenuating means for attenuating signal lights input to said second optical amplifying means; and second level control means for regulating an attenuation quantity attenuated by said second optical attenuating means and for controlling a power level of signal light output from said second optical amplifying means to be nearly constant.

9. An optical amplifying apparatus according to claim 4, wherein each of said first and second optical amplifying means is provided with a gain control portion for controlling a gain thereof to be nearly constant.

10. An optical amplifying apparatus according to claim 4, which further comprises:

intermediate optical amplifying means connected in cascade between said first and second optical amplifying means.

11. An optical amplifying apparatus according to claim 7, wherein each of said first and second optical amplifying means is provided with a gain control portion for controlling a gain thereof to be nearly constant.

12. An optical amplifying apparatus according to claim 7, which further comprises:

intermediate optical amplifying means connected in cascade between said first and second optical amplifying means.

\* \* \* \* \*